US007577370B2

(12) United States Patent
Lee et al.

(10) Patent No.: US 7,577,370 B2
(45) Date of Patent: Aug. 18, 2009

(54) METHOD AND APPARATUS FOR EXTRACTING OPTICAL CLOCK SIGNAL

(75) Inventors: Jaemyoung Lee, Seoul (KR); Je Soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 490 days.

(21) Appl. No.: 11/580,357

(22) Filed: Oct. 13, 2006

(65) Prior Publication Data

US 2007/0098410 A1 May 3, 2007

(30) Foreign Application Priority Data

Oct. 14, 2005 (KR) .................... 10-2005-0096947

(51) Int. Cl.
*H04B 10/02* (2006.01)
*H04B 10/142* (2006.01)
*G02F 1/365* (2006.01)
*G02F 2/02* (2006.01)

(52) U.S. Cl. .................... 398/203; 398/85; 398/82; 398/87; 398/95; 398/155; 398/154; 398/202

(58) Field of Classification Search .............. 398/85, 398/82, 87, 95, 155, 154, 202
See application file for complete search history.

(56) References Cited

U.S. PATENT DOCUMENTS

| 4,561,016 A | * | 12/1985 | Jung et al. ................ 357/527 |
| 4,775,972 A | * | 10/1988 | Ih et al. ...................... 398/79 |
| 4,856,899 A | * | 8/1989 | Iwaoka et al. ............. 356/454 |
| 4,863,230 A | * | 9/1989 | Webb ........................ 385/27 |
| 5,032,714 A | * | 7/1991 | Takahashi et al. ..... 250/214 VT |
| 5,257,126 A | * | 10/1993 | Calvani et al. ............. 398/184 |
| 5,365,361 A | * | 11/1994 | Noll et al. .................. 398/32 |

(Continued)

OTHER PUBLICATIONS

Farrell, G. "All-optical timing extraction with frequency division using atwin-section laser diode", Photonics Technology Letters, IEEE Publication Date: Jun. 1993 vol. 5, Issue: 6 On pp. 718-721.*

(Continued)

*Primary Examiner*—Ken N Vanderpuye
*Assistant Examiner*—Danny W Leung
(74) *Attorney, Agent, or Firm*—Blakely, Sokoloff, Taylor & Zafman

(57) ABSTRACT

An apparatus and method for extracting an optical clock signal are provided. The apparatus includes a first reflection filter selecting and reflecting only a first frequency component in an input optical signal; a first Fabry-Perot laser diode matching the first frequency component reflected by the first reflection filter with a predetermined output mode and outputting the first frequency component in the predetermined output mode; a second Fabry-Perot laser diode selecting a second frequency component in an input optical signal that has not been reflected but has been transmitted by the first reflection filter, matching the second frequency component with a predetermined output mode, and outputting the second frequency component in the predetermined output mode; and a photodetector receiving the first frequency component from the first Fabry-Perot laser diode and the second frequency component from the second Fabry-Perot laser diode and beating them to extract a clock signal. Accordingly, the optical clock signal can be extracted with low influence of the pattern of the input optical signal and an improved signal-to-noise ratio (SNR).

18 Claims, 5 Drawing Sheets

U.S. PATENT DOCUMENTS

| | | | | |
|---|---|---|---|---|
| 5,459,599 | A * | 10/1995 | Van Deventer | 398/136 |
| 5,467,212 | A * | 11/1995 | Huber | 398/168 |
| 5,940,207 | A * | 8/1999 | Weich et al. | 359/333 |
| 6,061,369 | A * | 5/2000 | Conradi | 372/6 |
| 6,097,487 | A * | 8/2000 | Kringlebotn et al. | 356/450 |
| 6,487,004 | B1 * | 11/2002 | Strutz et al. | 359/326 |
| 6,525,872 | B1 * | 2/2003 | Ziari et al. | 359/341.3 |
| 6,650,845 | B1 * | 11/2003 | Kurita et al. | 398/175 |
| 6,763,042 | B2 * | 7/2004 | Williams et al. | 372/6 |
| 6,775,009 | B2 * | 8/2004 | Hill | 356/516 |
| 6,867,904 | B2 * | 3/2005 | Ng et al. | 359/332 |
| 6,909,855 | B2 * | 6/2005 | Fuse et al. | 398/204 |
| 6,996,138 | B2 * | 2/2006 | Jung et al. | 372/18 |
| 7,092,645 | B1 * | 8/2006 | Sternowski | 398/204 |
| 7,149,431 | B2 * | 12/2006 | Jung et al. | 398/138 |
| 7,212,553 | B2 * | 5/2007 | Starodoumov et al. | 372/4 |
| 7,251,023 | B2 * | 7/2007 | Bohnert et al. | 356/73.1 |
| 7,263,291 | B2 * | 8/2007 | Mahgerefteh et al. | 398/82 |
| 7,317,574 | B2 * | 1/2008 | Zoller et al. | 359/577 |
| 7,373,086 | B2 * | 5/2008 | Yamamoto et al. | 398/146 |
| 2001/0038481 | A1 * | 11/2001 | Li et al. | 359/158 |
| 2002/0181833 | A1 * | 12/2002 | Berger | 385/15 |
| 2003/0075677 | A1 * | 4/2003 | Halmos | 250/227.23 |
| 2003/0151797 | A1 * | 8/2003 | Furukawa et al. | 359/326 |
| 2003/0185259 | A1 * | 10/2003 | Gamache et al. | 372/32 |
| 2005/0053101 | A1 * | 3/2005 | Liu | 372/6 |
| 2006/0013534 | A1 * | 1/2006 | Bohnert et al. | 385/37 |
| 2007/0041734 | A1 * | 2/2007 | Lee et al. | 398/154 |
| 2007/0058897 | A1 * | 3/2007 | Yong et al. | 385/12 |
| 2007/0071452 | A1 * | 3/2007 | Yeh | 398/182 |
| 2007/0086784 | A1 * | 4/2007 | Lee et al. | 398/152 |
| 2007/0098410 | A1 * | 5/2007 | Lee et al. | 398/155 |
| 2007/0159636 | A1 * | 7/2007 | Jayaraman | 356/451 |
| 2007/0242276 | A1 * | 10/2007 | Hughes et al. | 356/461 |
| 2009/0022188 | A1 * | 1/2009 | Almoric et al. | 372/22 |

OTHER PUBLICATIONS

Abedin, K.S., "Beat-spectrum-tailoring of fiber lasers with an intracavityFabry-Perot filter for high repetition-rate regenerative mode-locking", Lasers and Electro-Optics, 1999. CLEO '99. May 23-28, 1999 On pp. 100-101.*

"Optical signal processing for very high speed (40 Gbit/s) ETDM binary NRZ clock recovery", Bernd Franz, Alcatel Corporate Research Center-Optical Systems and Networks, 4 pages.

* cited by examiner

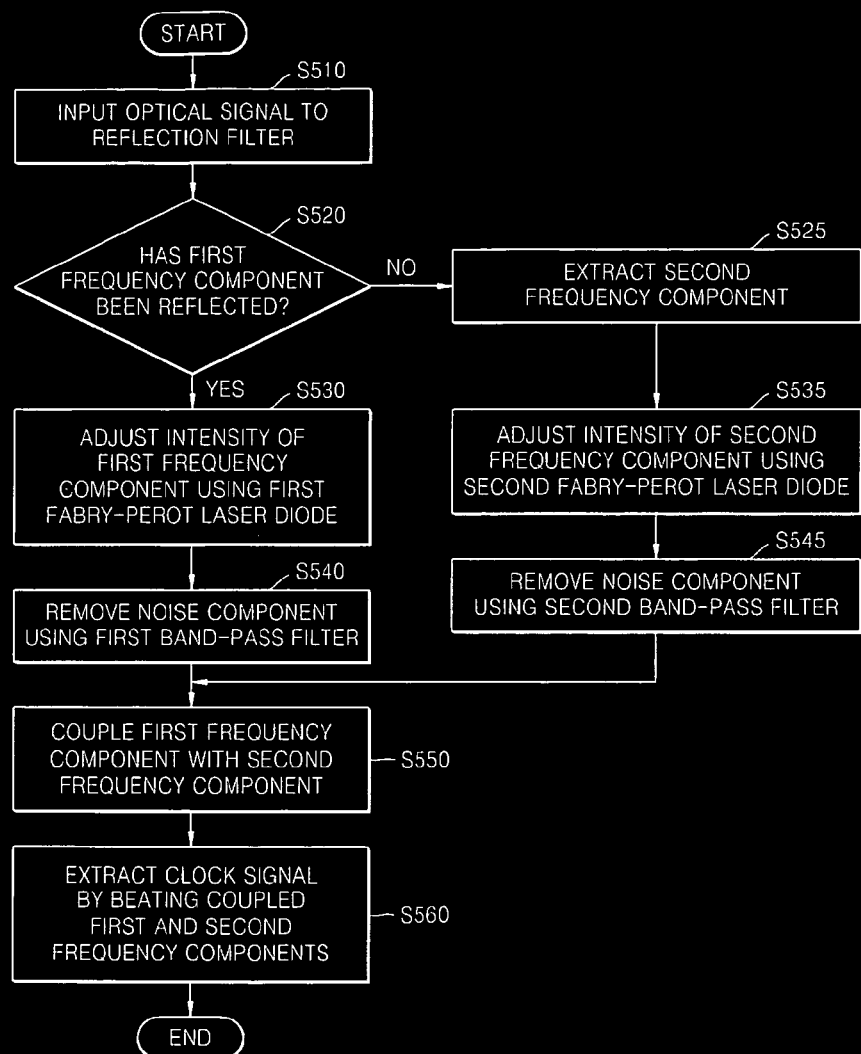

METHOD AND APPARATUS FOR EXTRACTING OPTICAL CLOCK SIGNAL

CROSS-REFERENCE TO RELATED PATENT APPLICATIONS

This application claims the benefit of Korean Patent Application No. 10-2005-0096947, filed on Oct. 14, 2005, in the Korean Intellectual Property Office, the disclosure of which is incorporated herein in its entirety by reference.

BACKGROUND OF THE INVENTION

1. Field of the Invention

The present invention relates to a method and apparatus for extracting an optical clock signal, and more particularly, to a method and apparatus for extracting an optical clock signal with reduced influence of the pattern of an input optical signal by using characteristics of a Fabry-Perot laser diode.

2. Description of the Related Art

With the increase of transmission speed in optical communication and the development of technology of a transmitter converting data into an optical signal, the increase of a signal processing rate of a receiver, which receives the optical signal and recovers it to the original data, has been required. To satisfy the request, a method and apparatus for extracting an optical clock signal have been studied.

To extract an optical clock signal, a method using a self-pulsating laser diode, a method using an optical loop mirror, a method using an optical tank circuit, etc. have been studied. However, it is still difficult to manufacture an optical element for extracting a desired clock signal and an optical system is still unstable.

To overcome these problems, a method of recovering a clock signal using a frequency component existing in an optical spectrum has been suggested. In other words, adjacent two frequency components corresponding to the data transmission rate of a received optical signal are extracted and beating is performed thereon to generate a frequency component corresponding to a difference between two spectral lines, so that a clock signal is recovered.

In the above-described conventional method, two frequency components are selected in an optical spectrum and made to have the same intensity. Thereafter, beating is performed on the two frequency components, thereby obtaining a clock signal for an optical signal. To select two frequency components and make them have the same intensity, a conventional method illustrated in FIG. 1 is used.

FIG. 1 illustrates a conventional system for extracting an optical clock signal using a tunable band-pass filter 120. Referring to FIG. 1, in order to make first and second frequency components or second and third frequency components have the same intensity in an input frequency spectrum 110, the intensity of the second frequency component should be decreased.

For an nonreturn-to-zero signal, the input optical signal with the input frequency spectrum 110 is passed through the tunable band-pass filter 120. The tunable band-pass filter 120 performs appropriate attenuation on frequency components of the input optical signal, thereby making the first and second frequency components or the second and third frequency components have the same intensity. In detail, the tunable band-pass filter 120 puts the first or third frequency component at a point P1 giving the least attenuation and puts the second frequency component at a point P2 giving the most attenuation to make the first and second frequency components or the second and third frequency components have the same intensity. Reference numeral 130 denotes the characteristic of the tunable band-pass filter 120.

Here, a difference between the intensity of the first frequency component and the intensity of the second frequency component or between the intensity of the second frequency component and the intensity of the third frequency component must be similar to a difference between attenuation at the point P1 and attenuation at the point P2 in the tunable band-pass filter 120 to make the first and second frequency components or the second and third frequency components have the same intensity within an error range. When a difference between the intensity difference and the attenuation difference is great, the method illustrated in FIG. 1 is not efficient. In other words, the tunable band-pass filter 120 suitable to the characteristics of an optical spectrum of an input optical signal needs to be used or the tunable band-pass filter 120 needs to be specially manufactured to be suitable to the characteristics of the optical spectrum of the input optical signal. Reference numeral 140 denotes an optical spectrum of the optical signal that has passed through the tunable band-pass filter 120.

Moreover, in the method illustrated in FIG. 1, an extracted clock signal is greatly influenced by the pattern of an input optical signal. In other words, when data of the input optical signal is continuously "0" or "1", a clock signal component may disappear.

SUMMARY OF THE INVENTION

The present invention provides a method and apparatus for extracting an optical clock signal, in which the intensity of a side-peak frequency component and the intensity of a central frequency component are made the same by controlling current or temperature of a Fabry-Perot laser diode, thereby greatly decreasing the influence of the pattern of an input optical signal and increasing a signal-to-noise ratio (SNR).

According to an aspect of the present invention, there is provided an apparatus for extracting an optical clock signal. The apparatus includes a first reflection filter selecting and reflecting only a first frequency component in an input optical signal; a first Fabry-Perot laser diode matching the first frequency component reflected by the first reflection filter with a predetermined output mode and outputting the first frequency component in the predetermined output mode; a second Fabry-Perot laser diode selecting a second frequency component in an input optical signal that has not been reflected but has been transmitted by the first reflection filter, matching the second frequency component with a predetermined output mode, and outputting the second frequency component in the predetermined output mode; and a photodetector receiving the first frequency component from the first Fabry-Perot laser diode and the second frequency component from the second Fabry-Perot laser diode and beating them to extract a clock signal.

According to another aspect of the present invention, there is provided a method extracting an optical clock signal. The method includes the operations of (a) selecting and reflecting only a first frequency component in an input optical signal; (b) matching the first frequency component reflected in operation (a) with a predetermined output mode of a first Fabry-Perot laser diode and outputting the first frequency component in the predetermined output mode; (c) selecting a second frequency component in the input optical signal that has not been reflected in operation (a) but has been transmitted, matching the second frequency component with a predetermined output mode of a second Fabry-Perot laser diode, and outputting the second frequency component in the predetermined output mode; and (d) beating the first frequency component obtained in operation (b) and the second frequency component obtained in operation (c) to extract a clock signal.

According to another aspect of the present invention, there is provided a computer readable recording medium for recording a program for executing the method in a computer.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart of a method of extracting an optical clock signal according to an embodiment of the present invention.

DETAILED DESCRIPTION OF THE INVENTION

Hereinafter, preferred embodiments of the present invention will be described in detail with reference to the attached drawings.

Figure 1:
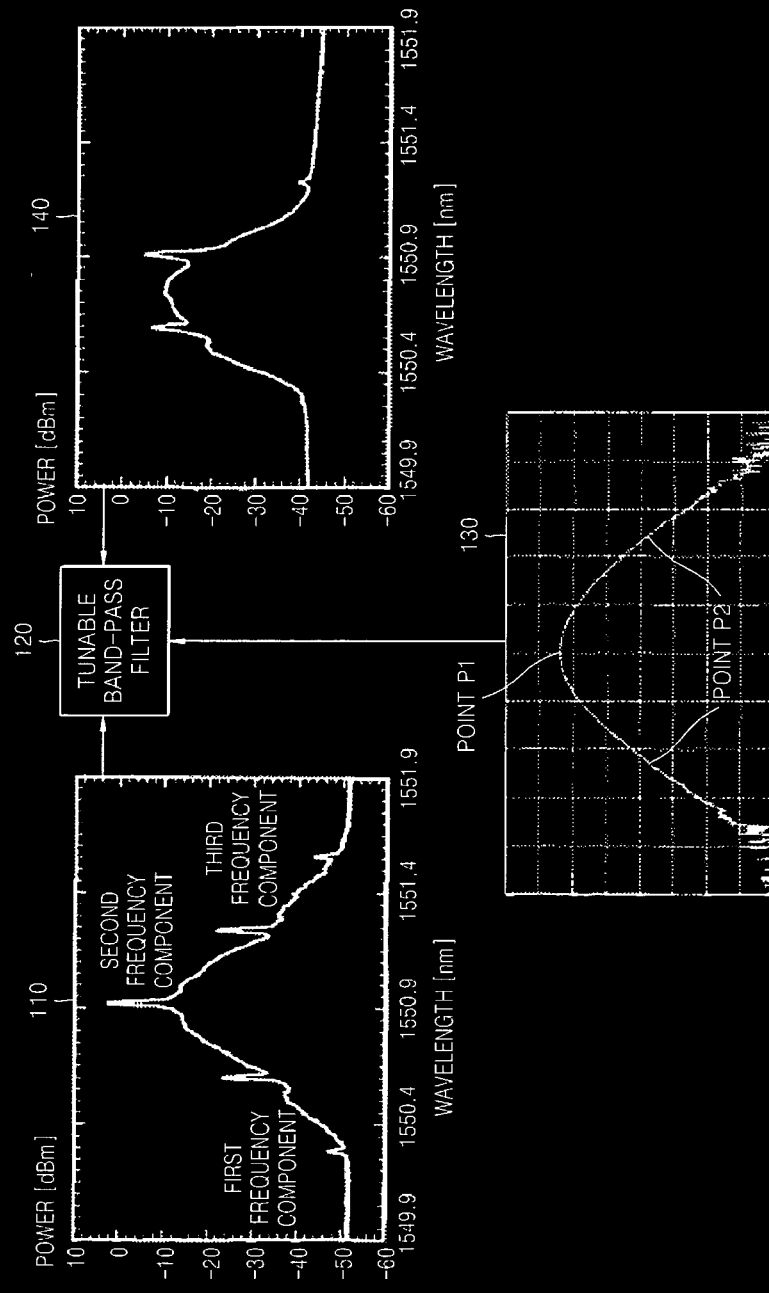
FIG. 1 illustrates a conventional circuit for extracting an optical clock signal using a tunable band-pass filter.
Figure 2:
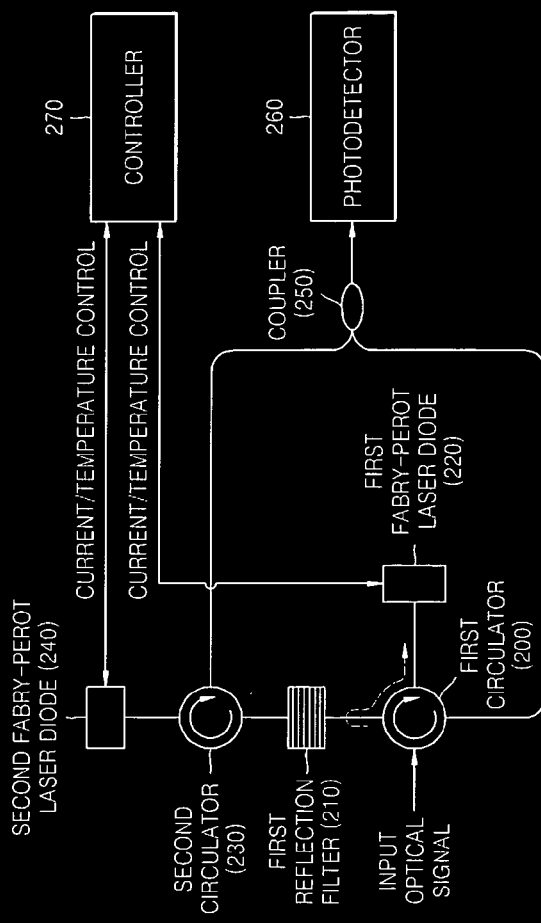
FIG. 2 is a block diagram of an apparatus for extracting an optical clock signal according to an embodiment of the present invention.

FIG. 2 is a block diagram of an apparatus for extracting an optical clock signal according to an embodiment of the present invention. Referring to FIG. 2, the apparatus includes a first circulator 200, a first reflection filter 210, a first Fabry-Perot laser diode 220, a second circulator 230, a second Fabry-Perot laser diode 240, a coupler 250, a photodetector 260, and a controller 270.

The first reflection filter 210 selects and reflects only a first frequency component in an input optical signal and transmits other frequency components.

The first circulator 200 receives an input optical signal from an input terminal of the circulator and circulates the input optical signal so that the input optical signal is input to the first reflection filter 210. In addition, the first circulator 200 circulates the first frequency component reflected from the first reflection filter 210 so that the first frequency component is input to the first Fabry-Perot laser diode 220.

The first Fabry-Perot laser diode 220 receives the first frequency component reflected by the first reflection filter 210, controls current or temperature applied thereto to match the first frequency component with its predetermined output mode, and then outputs the first frequency component to the first circulator 200.

The first circulator 200 receives the first frequency component matched with the predetermined output mode from the first Fabry-Perot laser diode 220 and circulates the first frequency component to output it to the coupler 250.

The frequency components transmitted by the first reflection filter 210 are input to the second circulator 230. The second circulator 230 circulates the input optical signal from which the first frequency component has been removed so that the input optical signal without the first frequency component is input to the second Fabry-Perot laser diode 240.

The second Fabry-Perot laser diode 240 receives the input optical signal without the first frequency component from the second circulator 230, controls current or temperature applied thereto to match the input optical signal without the first frequency component with its predetermined output mode, and then selects and outputs a second frequency component to the second circulator 230.

The second circulator 230 receives the second frequency component matched with the predetermined output mode from the second Fabry-Perot laser diode 240 and circulates the second frequency component to output it to the coupler 250.

The coupler 250 receives the first frequency component and the second frequency component from the first circulator 200 and the second circulator 230, respectively, couples them, and outputs the coupled first and second frequency components to the photodetector 260.

The photodetector 260 performs beating of the coupled first and second frequency components, thereby extracting a clock signal.

The controller 270 individually controls the first Fabry-Perot laser diode 220 and the second Fabry-Perot laser diode 240 to make the first frequency component and the second frequency component have the same intensity. Here, the controller 270 controls current or temperature applied to each of the first and second Fabry-Perot laser diodes 220 and 240 to make the intensity of the first frequency component the same as the intensity of the second frequency component.

In addition, the controller 270 enables only a particular frequency component to be selected in an input optical signal by controlling current or temperature applied to each of the first and second Fabry-Perot laser diodes 220 and 240.

In an optical spectrum, the intensity of a side-peak frequency component is less than that of a central frequency component. In this situation, to maximize the intensity of a clock signal obtained by beating the two frequency components against the intensity of an ambient noise components, it is necessary to make the two frequency components have the same intensity. Referring to FIG. 2, two frequency components are selected and made to have the same intensity by the operation of the controller 270 controlling current or temperature applied to the first Fabry-Perot laser diode 220 and the second Fabry-Perot laser diode 240.

Here, the first frequency component may be one among side-peak frequency components of the input optical signal and the second frequency component may be the central frequency component of the input optical signal. Since the side-peak frequency component has less intensity than the central frequency component, the side-peak frequency component may be input to the first Fabry-Perot laser diode 220 having a shorter optical path than the second Fabry-Perot laser diode 240 to minimize the decrease of the intensity over the optical path.

In addition, a non-return-to-zero (NRZ) optical modulation signal may be used as the input optical signal. Since the first circulator 200, the first reflection filter 210, the first Fabry-Perot laser diode 220, the second circulator 230, and the second Fabry-Perot laser diode 240 can be used only for an optical signal, an NRZ electrical signal cannot be used as it is. In an embodiment of the present invention, the fact that an optically modulated NRZ signal has a side-peak frequency component is used. In other words, a side-peak frequency component is not present in an NRZ electrical signal but is present in an NRZ optical modulation signal, and therefore, the NRZ optical modulation signal is used as the input optical signal.

Figure 3:
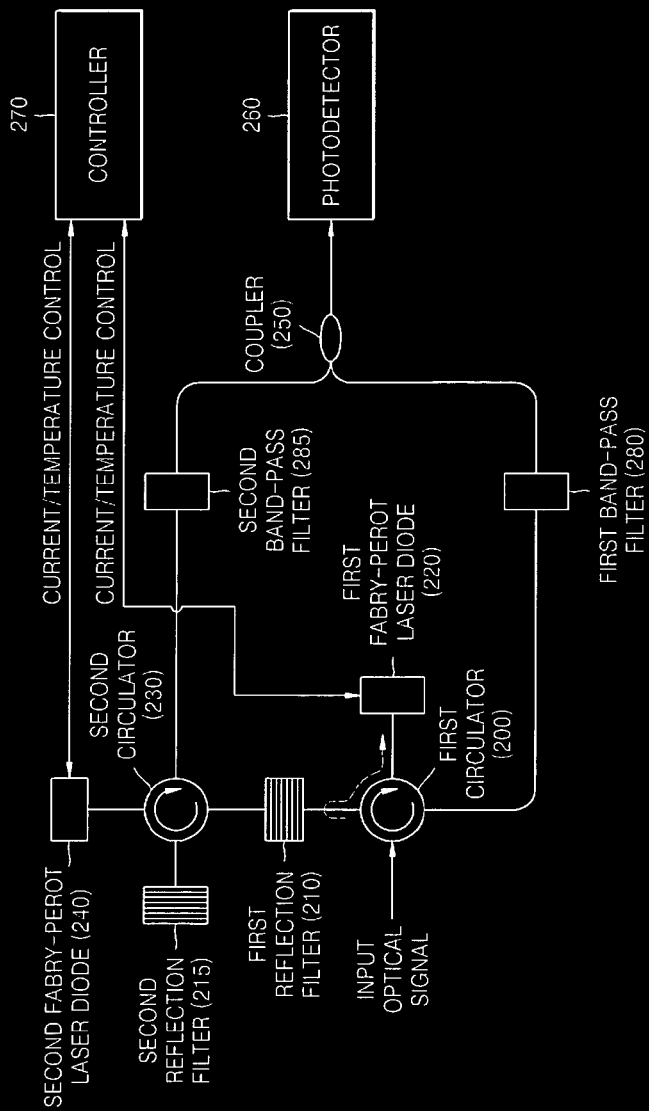
FIG. 3 is a block diagram of an apparatus for extracting an optical clock signal according to another embodiment of the present invention.

FIG. 3 is a block diagram of an apparatus for extracting an optical clock signal according to another embodiment of the present invention. Referring to FIG. 3, the apparatus includes a first circulator 200, a first reflection filter 210, a second reflection filter 215, a first Fabry-Perot laser diode 220, a second circulator 230, a second Fabry-Perot laser diode 240, a coupler 250, a photodetector 260, a controller 270, a first band-pass filter 280, and a second band-pass filter 285.

With respect to members denoted by the same reference numerals in FIGS. 2 and 3, the above description may be referred to. Hereinbelow, new members, i.e., the second reflection filter 215, the first band-pass filter 280, and the second band-pass filter 285 will be described.

Frequency components of an input optical signal transmitted by the first reflection filter 210 are input to the second circulator 230.

The second reflection filter 215 selects and reflects a second frequency component in the input optical signal from which a first frequency component has been removed.

The second circulator 230 circulates the input optical signal from which the first frequency component has been removed to output it to the second reflection filter 215. In addition, the second circulator 230 circulates the second frequency component reflected from the second reflection filter 215 to output it to the second Fabry-Perot laser diode 240.

The second Fabry-Perot laser diode 240 receives the second frequency component from the second circulator 230, matches the second frequency component with its predetermined output mode according to current or temperature applied thereto by the controller 270, and then outputs the second frequency component to the second circulator 230.

The second circulator 230 receives the second frequency component matched with the predetermined output mode from the second Fabry-Perot laser diode 240 and circulates the second frequency component to output it to the coupler 250.

The first band-pass filter 280 is disposed between the first circulator 200 and the coupler 250 and removes noise components from the first circulator 200 together with the first frequency component. After the noise components are removed, the first band-pass filter 280 also outputs the first frequency component to the coupler 250.

The second band-pass filter 285 is disposed between the second circulator 230 and the coupler 250 and removes noise components from the second circulator 230 together with the second frequency component. After the noise components are removed, the second band-pass filter 285 outputs the second frequency component to the coupler 250.

The reason why the noise components are removed using the first band-pass filter 280 and the second band-pass filter 285 will be described below. Each of the first Fabry-Perot laser diode 220 and the second Fabry-Perot laser diode 240 outputs a frequency component in one output mode among a plurality of output modes according to current or temperature applied thereto by the controller 270. However, frequency components are also output in other output modes as well as a desired output mode in the first Fabry-Perot laser diode 220 and the second Fabry-Perot laser diode 240. To remove output components in output modes other than the desired output mode, the first band-pass filter 280 and the second band-pass filter 285 are used. When the first band-pass filter 280 and the second band-pass filter 285 are used, a signal-to-noise ratio (SNR) is increased.

Figure 4:
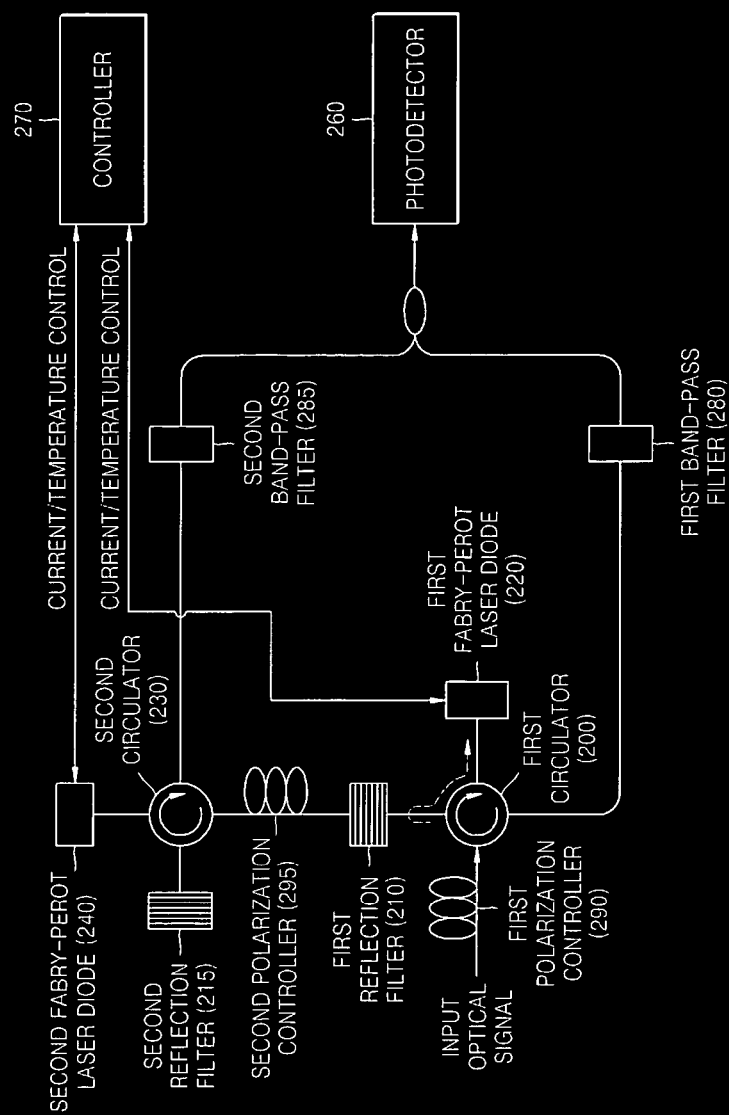
FIG. 4 is a block diagram of an apparatus for extracting an optical clock signal according to still another embodiment of the present invention.

FIG. 4 is a block diagram of an apparatus for extracting an optical clock signal according to still another embodiment of the present invention. Referring to FIG. 4, the apparatus includes a first circulator 200, a first reflection filter 210, a second reflection filter 215, a first Fabry-Perot laser diode 220, a second circulator 230, a second Fabry-Perot laser diode 240, a coupler 250, a photodetector 260, a controller 270, a first band-pass filter 280, a second band-pass filter 285, a first polarization controller 290, and a second polarization controller 295.

With respect to members denoted by the same reference numerals in FIGS. 2 through 4, the above description may be referred to. Hereinbelow, new members, i.e., the first polarization controller 290 and the second polarization controller 295 will be described.

The first polarization controller 290 is disposed between an input terminal of the apparatus and the first circulator 200 and controls only a particular polarization component in an input optical signal to be input to the first reflection filter 210.

The second polarization controller 295 is disposed between the first reflection filter 210 and the second circulator 230 and controls only a particular polarization component in the input optical signal to be input to the second circulator 230.

When the first polarization controller 290 and the second polarization controller 295 are used, only particular polarization component is input to each of the first Fabry-Perot laser diode 220 and the second Fabry-Perot laser diode 240, so that the SNR can be increased.

FIG. 5 is a flowchart of a method of extracting an optical clock signal according to an embodiment of the present invention. Referring to FIG. 5, an input optical signal is input to a reflection filter, which selects and reflects only a first frequency component, in operation S510.

In operation S520, it is determined that a corresponding frequency component has been reflected. The determination is made such that the first frequency component desired to be reflected is reflected and the input optical signal from which the first frequency component has been removed is transmitted.

When it is determined that the corresponding frequency component has been reflected in operation S520, that is, when the first frequency component is input, the intensity of the first frequency component is adjusted using a first Fabry-Perot laser diode in operation S530. Thereafter, in operation S540, noise components existing together with the intensity adjusted first frequency component are removed using a first band-pass filter.

When it is determined that the corresponding frequency component has not been reflected in operation S520, that is, when the first frequency component is not input, a second frequency component is extracted from the input optical signal in operation S525.

In operation S535, the intensity of the second frequency component is adjusted using a second Fabry-Perot laser diode. In operation S545, noise components existing together with the intensity adjusted second frequency component are removed using a second band-pass filter.

After operation S540 or S545, the first frequency component is coupled with the second frequency component in operation S550. Next, in operation S560, a clock signal is extracted by beating the coupled first and second frequency components.

Here, the first frequency component may be one among side-peak frequency components of the input optical signal and the second frequency component may be the central frequency component of the input optical signal. Since the side-peak frequency component has less intensity than the central frequency component, the side-peak frequency component may be input to the first Fabry-Perot laser diode having a shorter optical path than the second Fabry-Perot laser diode to minimize the decrease of the intensity over the optical path.

In addition, an NRZ optical modulation signal may be used as the input optical signal. Since the reflection filter and the first and second Fabry-Perot laser diodes can be used only for an optical signal, an NRZ electrical signal cannot be used as it is. In an embodiment of the present invention, the fact that an optically modulated NRZ signal has a side-peak frequency component is used. In other words, a side-peak frequency component is not present in an NRZ electrical signal but is present in an NRZ optical modulation signal, and therefore, the NRZ optical modulation signal is used as the input optical signal.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the influence of the pattern of an input optical signal is great in conventional method and apparatus for extracting an optical clock signal, the influence can be greatly reduced due to the characteristics of a Fabry-Perot laser diode in the present invention. In addition, according to the present invention, current or temperature applied to the Fabry-Perot laser diode is controlled to maintain the amplitude of a clock signal constant, so that the SNR of the clock signal can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for extracting an optical clock signal, the apparatus comprising:
   a first reflection filter selecting and reflecting only a first frequency component in an input optical signal;
   a first Fabry-Perot laser diode matching the first frequency component reflected by the first reflection filter with a predetermined output mode and outputting the first frequency component in the predetermined output mode;
   a second Fabry-Perot laser diode selecting a second frequency component in an input optical signal that has not been reflected but has been transmitted by the first reflection filter, matching the second frequency component with a predetermined output mode, and outputting the second frequency component in the predetermined output mode; and
   a photodetector receiving the first frequency component from the first Fabry-Perot laser diode and the second frequency component from the second Fabry-Perot laser diode and beating them to extract a clock signal.

2. The apparatus of claim 1, further comprising a controller individually controlling the first Fabry-Perot laser diode and the second Fabry-Perot laser diode to make the first frequency component and the second frequency component have the same intensity.

3. The apparatus of claim 2, wherein the controller controls current or temperature applied to each of the first Fabry-Perot laser diode and the second Fabry-Perot laser diode.

4. The apparatus of claim 1, further comprising:
   a first circulator receiving and transmitting the input optical signal to the first reflection filter, transmitting the first frequency component reflected by the first reflection filter to the first Fabry-Perot laser diode, and transmitting the first frequency component output from the first Fabry-Perot laser diode to the photodetector; and
   a second circulator transmitting the input optical signal that has not been reflected but has been transmitted by the first reflection filter to the second Fabry-Perot laser diode and transmitting the second frequency component output from the second Fabry-Perot laser diode to the photodetector.

5. The apparatus of claim 4, further comprising a second reflection filter disposed between the second circulator and the second Fabry-Perot laser diode, the second reflection filter receiving the input optical signal from the second circulator, selecting the second frequency component in the input optical signal, and reflecting the second frequency component to the second Fabry-Perot laser diode.

6. The apparatus of claim 4, further comprising:
   a first band-pass filter disposed between the first circulator and the photodetector to remove noise components from the first circulator together with the first frequency component; and
   a second band-pass filter disposed between the second circulator and the photodetector to remove noise components from the second circulator together with the second frequency component.

7. The apparatus of claim 1, further comprising:
   a first polarization controller controlling only a particular polarization component in the input optical signal to be input to the first reflection filter; and
   a second polarization controller disposed between the first reflection filter and the second Fabry-Perot laser diode to control only a particular polarization component in the input optical signal to be input to the second Fabry-Perot laser diode.

8. The apparatus of claim 1, further comprising a coupler receiving the first frequency component from the first Fabry-Perot laser diode and the second frequency component from the second Fabry-Perot laser diode, coupling them, and outputting the coupled first and second frequency components to the photodetector.

9. The apparatus of claim 1, wherein the first frequency component is one component among side-peak frequency components of the input optical signal.

10. The apparatus of claim 1, wherein the second frequency component is a central frequency component of the input optical signal.

11. A method extracting an optical clock signal, the method comprising the operations of:
   (a) selecting and reflecting only a first frequency component in an input optical signal;
   (b) matching the first frequency component reflected in operation (a) with a predetermined output mode of a first Fabry-Perot laser diode and outputting the first frequency component in the predetermined output mode;
   (c) selecting a second frequency component in the input optical signal that has not been reflected in operation (a) but has been transmitted, matching the second frequency component with a predetermined output mode of a second Fabry-Perot laser diode, and outputting the second frequency component in the predetermined output mode; and (d) beating the first frequency component obtained in operation (b) and the second frequency component obtained in operation (c) to extract a clock signal.

12. The method of claim 11, wherein the first frequency component obtained in operation (b) and the second frequency component obtained in operation (c) have a same intensity.

13. The method of claim 12, wherein the intensity of the first frequency component obtained in operation (b) and the intensity of the second frequency component obtained in operation (c) are adjusted by controlling current or temperature applied to the first Fabry-Perot laser diode and the second Fabry-Perot laser diode, respectively.

14. The method of claim 11, further comprising:

removing noise components together with the first frequency component in operation (b) and going to operation (d); and removing noise components together with the second frequency component in operation (c) and going to operation (d).

15. The method of claim 11, wherein operation (d) comprises:

coupling the first frequency component obtained in operation (b) with the second frequency component obtained in operation (c); and beating the coupled first and second frequency components to extract the clock signal.

16. The method of claim 11, wherein the first frequency component is one component among side-peak frequency components of the input optical signal.

17. The method of claim 11, wherein the second frequency component is a central frequency component of the input optical signal.

18. The method of claim 11, wherein the input optical signal is a no-return-to-zero (NRZ) optical modulation signal.

* * * * *